No. 760,543. PATENTED MAY 24, 1904.
F. MARTIN.
SEWAGE PURIFYING APPARATUS.
APPLICATION FILED JAN. 2, 1902.
NO MODEL. 5 SHEETS—SHEET 1.

Fig. 1

Witnesses: Inventor
Jas. F. Coleman Frank Martin
Jno. Robt. Taylor by Dyer Edmonds & Dyer
Attorneys

No. 760,543. PATENTED MAY 24, 1904.
F. MARTIN.
SEWAGE PURIFYING APPARATUS.
APPLICATION FILED JAN. 2, 1902.
NO MODEL. 5 SHEETS—SHEET 3.

Witnesses:
Jas. F. Coleman
Jno. Robt Taylor

Inventor
Frank Martin
by
Ayer Edmonds & Ayer
Attorneys

No. 760,543. PATENTED MAY 24, 1904.
F. MARTIN.
SEWAGE PURIFYING APPARATUS.
APPLICATION FILED JAN. 2, 1902.
NO MODEL. 5 SHEETS—SHEET 4.

Witnesses:
Jas. F. Oleman
Jno. Robt Taylor

Inventor
Frank Martin
by Dyer Edmonds
Attorneys

No. 760,543. PATENTED MAY 24, 1904.
F. MARTIN.
SEWAGE PURIFYING APPARATUS.
APPLICATION FILED JAN. 2, 1902.
NO MODEL. 5 SHEETS—SHEET 5.

No. 760,543. Patented May 24, 1904.

UNITED STATES PATENT OFFICE.

FRANK MARTIN, OF CAMDEN, MAINE, ASSIGNOR TO THE ECONOMIC-SANITARY COMPANY, OF NEW YORK, N. Y., A CORPORATION OF MONTANA.

SEWAGE-PURIFYING APPARATUS.

SPECIFICATION forming part of Letters Patent No. 760,543, dated May 24, 1904.

Application filed January 2, 1902. Serial No. 88,089. (No model.)

*To all whom it may concern:*

Be it known that I, FRANK MARTIN, a citizen of the United States, residing at Camden, in the county of Knox and State of Maine, have invented a certain new and useful Improvement in Sewage-Purifying Apparatus, of which the following is a description.

My invention relates to an improved apparatus for use in the purification of sewage by the so-called "vital" process of nitrification; and my object is to provide a connected apparatus wherein large quantities of sewage may be subjected to the purifying operations with relative economy and high efficiency.

In a general way the apparatus comprises suitable devices by means of which any solid matter in suspension will be separated from the liquid effluent of the sewage, the collected residue being conveyed to a suitable cremating-furnace, where it is incinerated with or without garbage, as may be desired, or a septic tank provided with the necessary detritus catch-basins and connections may be substituted for the separating devices referred to, in which event the solid organic matter in the septic tank will be reduced or liquefied by the action of the anaërobic organisms therein and there will be little or no accumulation of solid matter to be disposed of by incineration or otherwise. The liquid effluent or filtrate is then subjected to the action of a nitrifying apparatus, wherein the zoöglœa present result in the conversion of any nitrogenous organic matter into nitric acid, which in turn is converted to a harmless nitrate by the action of carbonate of lime or magnesia, the nitrifying operation being carried on in the presence of sufficient oxygen for the purpose. From the nitrifying apparatus the liquid effluent, having been freed of bacterial taint, is conveyed through one or more settling or filtering devices until it has become thoroughly purified.

In its preferred embodiment my improved apparatus comprises, first, a plurality of approximately horizontal charcoal filters for effecting the separation of the solid impurities, which filters are of novel construction and are so arranged as to be readily cleaned when desired; second, a long continuous nitrifying-sluice, closed to air and light, partially filled with broken pieces of soft carbonate of lime or magnesia, (unless the water is very hard,) and through which the liquid effluent slowly percolates, said sluice for purposes of compactness being composed of a large number of connected parallel sections arranged side by side and air-pipes being preferably placed in the bottom of each section for properly aerating the liquid, the ends of said sluice being preferably closed with a water seal to prevent the escape of any noxious gases which may be generated therein; third, one or more intermediate filters for refiltering the nitrified effluent and which are preferably simply open tanks having filter-beds therein through which the liquid percolates; fourth, one or more resting-tanks of large size, and, fifth, a filtering device coöperating with and preferably surrounding the resting tank or tanks, whereby the liquid which flows from the same will be subjected to a final filtering and oxidizing process.

I employ in connection with my improved purifying apparatus any suitable incinerating device for cremating the solid or semisolid sludge which may accumulate in the filtering or settling devices, which furnace is preferably supplied with air from the apparatus, so that any noxious gases contained therein will be dissociated and made harmless. This cremation-furnace also preferably supplies heat for the heating of the air used in aerating the nitrification sluice or sluices, since the employment of heated air for this purpose is considered preferable.

In order that the invention may be better understood, attention is directed to the accompanying drawings, forming part of this specification, in which—

Fig. 12, a section on the line 12 12 of Fig. 1, showing the water seal at the upper end of the nitrifying-sluice.

In all of the above views corresponding parts are represented by the same numerals of reference.

Figure 1:
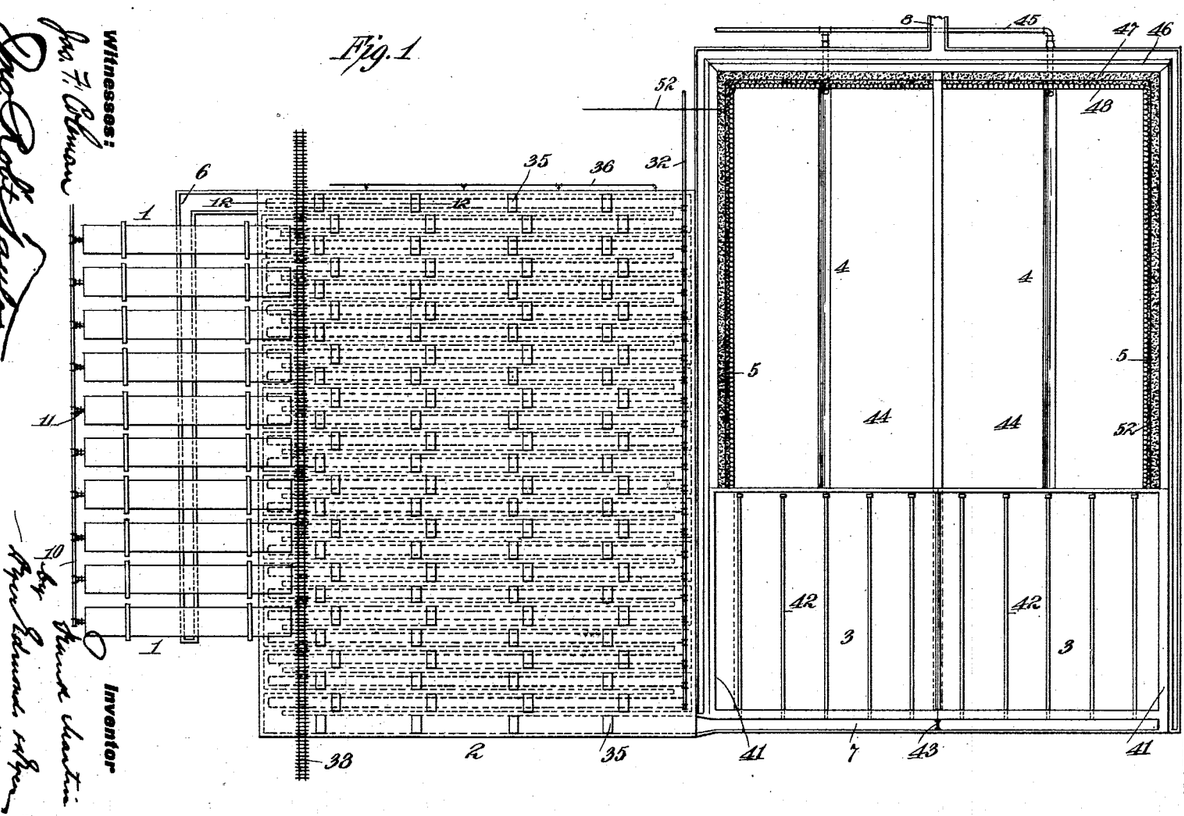
Figure 1 is a plan view of the apparatus, illustrating ten rotary primary filters, a single long connected nitrification-sluice formed of parallel connected sections, two intermediate filters, a pair of resting-tanks, and a vertical filter surrounding the latter, which apparatus as a whole constitutes the preferred embodiment of the invention.
Figure 2:
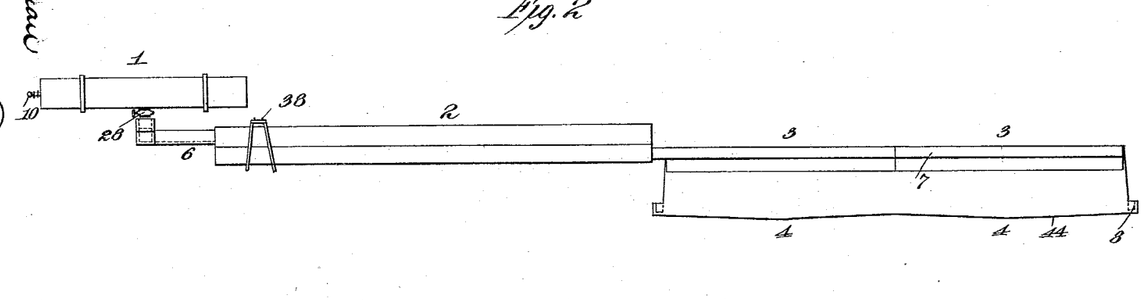
Fig. 2, a side elevation of the same apparatus.
Figure 3:
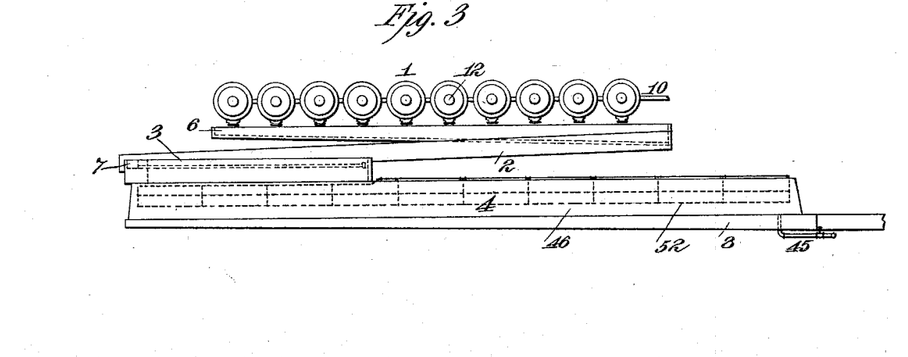
Fig. 3, an end view of the same.

Referring first to Figs. 1, 2, and 3, 1 1 represent the rotary filters which receive the sewage from the usual catch-basin and separate the solid impurities therefrom, which latter are incinerated in a suitable cremation apparatus; 2, the nitrifying apparatus, which is in the form of a long sluice or tunnel composed of sections arranged side by side and connected together; 3 3, two intermediate filters for filtering the liquid effluent after it has passed through the nitrifying apparatus; 4 4, a pair of resting-tanks which receive the filtrate from the filters 3 3, and 5 a vertical filter which surrounds the resting-tanks and which performs a final filtering operation on the liquid. The liquid effluent from the filters 1 is conveyed to the upper end of the nitrifying apparatus through a trough 6. The nitrified liquid from that apparatus is conveyed to the intermediate filters by a trough 7. The liquid passes by gravity from the intermediate filters 3 to the resting-tanks 4, and the final filtrate from the filters 5 is withdrawn from the same through the trough 8.

The parts which have been generally referred to will be described in detail.

Figure 4:
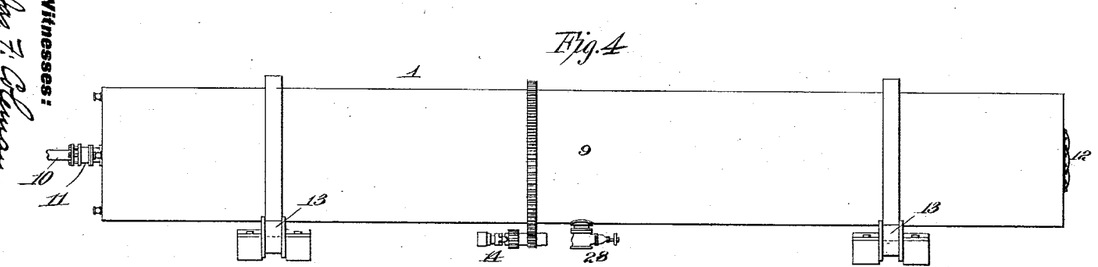
Fig. 4, an enlarged side elevation of one of the rotary filters.

*Rotary filters.*—Each rotary filter comprises a long shell 9, made, preferably, of boiler-iron and of large size. I contemplate making the filters about fifty feet in length, with a diameter of seven feet, and each comprises a unit which can be indefinitely extended to any desired capacity. At one end of the shell is an inlet-pipe 10, provided with a packing 11 to permit the shell to rotate, and at the other end the shell is provided with a series of manholes 12 for disclosing its interior to permit any sludge to be removed therefrom. Each filter is mounted on rollers 13 and is adapted to be rotated from a shaft 14. Secured within each of the filter-shells are the metal stays 15, and connecting said stays are the auxiliary braces 16, forming, therefore, within the shell a hollow rectangular box-like skeleton or frame. Secured on the inside of this frame are boards or planks 17, having spaces 18 between them and each being formed with a series of slots 19 therein, thus forming within each filter-shell a preferably wooden box having longitudinal perforations in its walls formed by the spaces between the boards or planks and with vertical perforations formed by the slots 19. Mounted within the box or inner casing so formed within the shell are longitudinal partitions 20 (see Fig. 5) and cross-partitions 21, (see Fig. 6,) these partitions being formed similar to an egg-crate and constituting pockets for receiving the filtering material. On the inside of the partitions referred to I place the screen-section 22, which preferably is formed of a perforated plate, although for purposes of illustration I illustrate a wire screen which can of course be used. This screen is secured in position by angle-irons 23 at the corners and forms practically the inner face of the pockets for receiving the filtering material. Secured between the angle-irons 23 are the inclined conveyer-flights 24, which also serve to strengthen the screen-sections 22 and prevent the latter from being displaced or distorted when the operation is reversed in the cleaning process.

Figure 5:
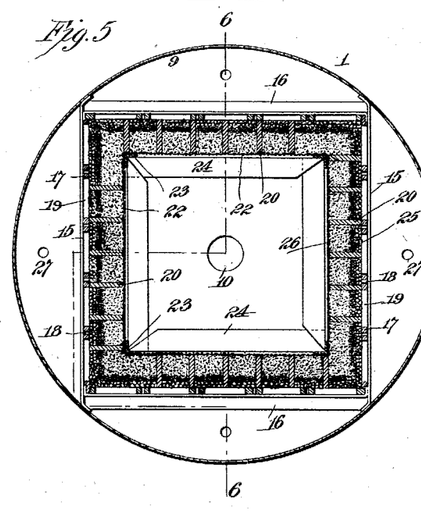
Fig. 5, a cross-section of the same on an enlarged scale.
Figure 6:
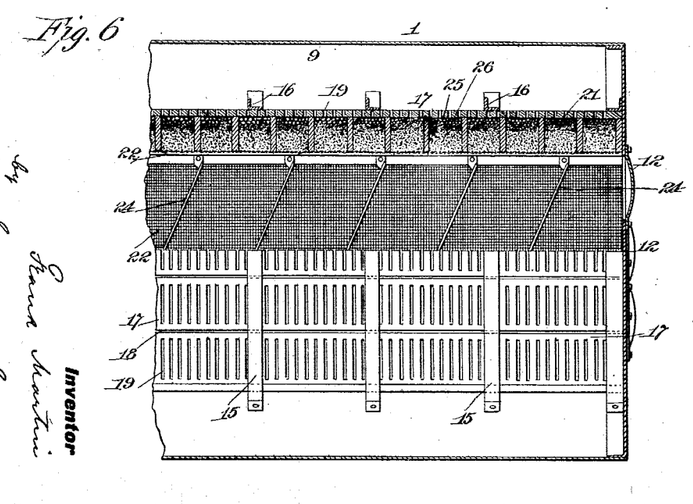
Fig. 6, a section on the line 6 6 of Fig. 5.

In the pockets formed between the partitions 20 and 21 I place the screening material, which preferably comprises the relatively large portions 25, the diameter of which is sufficient to prevent them from passing through the slots in or between the boards 17 and the fine particles 26 next to the screen-surfaces 22. If desired, the size of the screening particles may be gradually varied between these extremes. The filtering material may be charcoal, coke, coal, cinder, or other suitable substance properly broken and screened to the desired size. Each filter is provided between its shell and the "filter-bed" therein (the latter term including the filtering material, with the supports therefor) with a plurality of air-pipes 27 for admitting air to the interior of the filter when desired, and each filter also is provided with a valved draw-off pipe 28, located above the trough 6 and through which the effluent or filtrate which passes the filter-bed may be conveyed to the nitrifying sluice or sluices.

Figure 7:
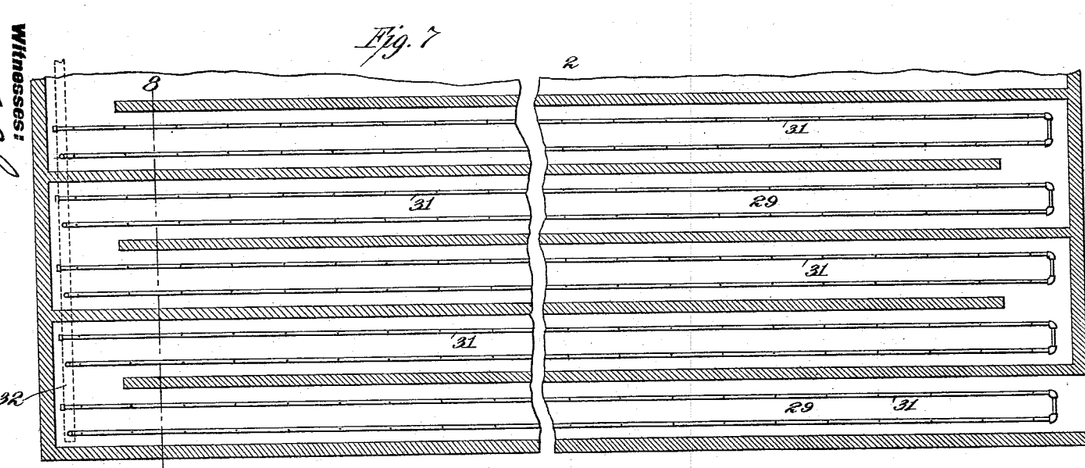
Fig. 7, a horizontal detail section of a portion of the nitrifying apparatus.
Figures 8, 9:
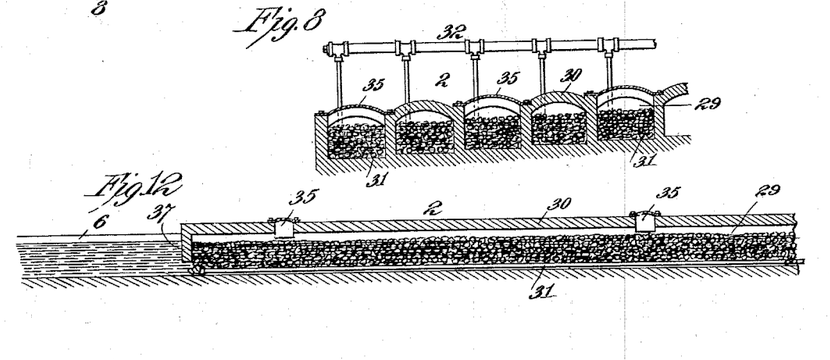
Fig. 8, a cross-section on the line 8 8 of Fig. 7.
Fig. 9, a detail section of a portion of one of the intermediate filters.
Figure 9:
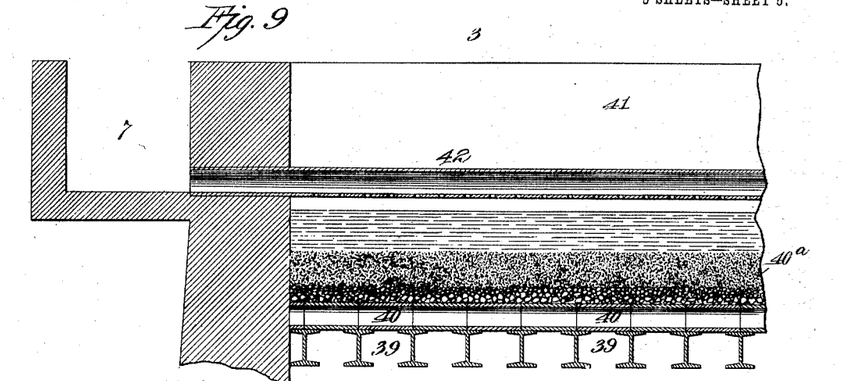

*Nitrifying apparatus.*—The nitrifying apparatus is in the form of a long tunnel 29, having a curved top wall 30. This tunnel is arranged in parallel sections placed side by side, as shown, each of which may be regarded as constituting a sluice, so as to economize space. The bottom of the tunnel from the inlet to the outlet is slightly inclined, (say with a fall of one-quarter inch to each twelve feet of length,) so that the liquid effluent will flow slowly through the same.

The nitrifying-sluices are filled with broken pieces of soft carbonate of lime or magnesia, (unless the water be very hard,) and in the bottom of the sluices are placed the aerating-pipes 31, suitably perforated and connected to a distributing-pipe 32 for supplying compressed air to the same. The tops of the sluices are provided with manholes 35, normally closed, but which permit the sluices to be reached for the purpose of inspection or repairs. Leading out of the tunnel 29 at its upper side is a pipe 36 (see Fig. 1) for conveying the air, preferably, to the cremating apparatus, where any noxious gases which may be carried thereby will be immediately dissociated and made harmless. In order to prevent the escape of any gases from the nitrifying apparatus, the tunnel 29 at each end is provided with a down-turned leg 37, (see Fig. 12,) which is immersed in the liquid, and therefore provides a water seal for the purpose. The trough 6 leads into the tunnel 29 at its upper end, and the trough 7 leads out of the lower end of said tunnel.

In Fig. 1 of the drawings I show a track 38 placed on top of the nitrifying apparatus and running adjacent to the ends of the rotary filters and on which a car travels for carrying the sludge removed from the filters to the incinerating-furnace. It will be understood, of course, that any other suitable device or apparatus may be employed for conveying the sludge to the incinerating-furnace.

*Intermediate filters.*—The intermediate filters 3 3 are preferably two in number and are located in front of the nitrifying apparatus. These intermediate filters are carried on a bed formed of I-beams 39, spaced a short distance apart and carrying porous tiles 40, covered with a layer 40ª of sand or similar material, to thereby constitute a filter-bed. The walls 41 of the intermediate filters extend up from this bed and are of any suitable construction. Leading out from the trough 7 and extending into the intermediate filters are the perforated pipes 42, which distribute the liquid effluent from the trough 7 equally throughout all portions of the filters. I show a sluice-gate 43 in the trough 7 for properly regulating the flow of the liquid to the two filters or for cutting off the second filter when desired.

Figures 10, 11:
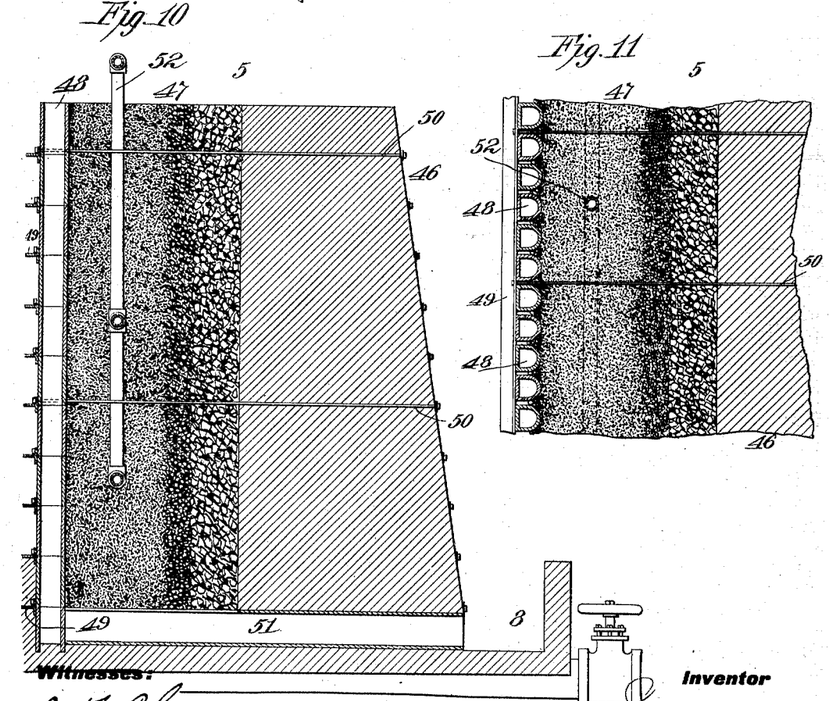
Fig. 10, a section through one wall of the resting-tanks, showing particularly the construction of the vertical filters.
Fig. 11, a horizontal section through the same.

*Resting-tanks and vertical filters.*—Below the intermediate filters are the two resting-tanks 4 4, which are simply large tanks of sufficiently great capacity to permit of a sufficient accumulation of liquid as to allow a resting operation to take place therein. The bottom 44 of each tank inclines down to the center, and the bottom as a whole inclines toward the forward end, so that any solid matter which may in turn settle by gravity will slowly work toward the front end of the resting-tank and be drawn off through a pipe 45 when desired. The filtrate from the intermediate filters percolates by gravity through the filter-bed into the resting-tanks. In practice it is the intention that all the solid matter will be removed from the liquid before the latter reaches the resting-tanks, although the latter will naturally become foul after being in use for some time and will require cleaning, and it is for this reason that provision to that end has been made.

The side and front walls of the resting-tanks constitute also the improved vertical filters, which permit a filtering operation to take place in the drawing out of the liquid from said tanks. I make these walls 46 of very solid construction, preferably of concrete, adjacent to which is a heavy layer 47 of filtering material, preferably fine charcoal or gravel. This filtering material is held in place against the wall 46 by the vertical tiles 48, made, preferably, D shape in cross-section and properly supported by the T-beams 49, which are connected to the wall 46 by tie-rods 50. Any liquid from the resting-tanks in order to pass out of the same will be required to percolate through the filtering material 47. Leading through the wall 46 are the pipes 51, which connect with the drain or trough 8 and through which the purified liquid may be conducted into the nearest stream or watercourse as a perfect product or be otherwise used. It will thus be seen that the liquid after passing the rotary filters 1 flows by gravity through the succeeding elements of the apparatus and does not require any special handling. A perforated air-pipe 52 is located in the bed of filtering material 47, so that the liquid in being filtered in the vertical filters can be subjected to a final aeration.

*Operation.*—The sewage from the catch-basin or other source of original supply is pumped under pressure through the pipes 10 into any desired number of the rotary filters 1. Preferably I make use of a sufficient number of these filters as to permit several of them to be idle, so that in case of a breakdown the plant can be always run to its desired capacity and also to permit the filters to be cleaned while others are being operated. The sewage fills the space inclosed by the screen 22 and finds its only escape through the filtering material into the space surrounding the filter-bed, the liquid effluent escaping through the draw-off pipe 28 and flowing into the trough 6. The solid impurities in the sewage will be caught and retained within the filtering material. Since the air which is contained in the interstices of the filter-bed is rapidly exhausted in this operation, it is desirable to aerate the effluent by forcing air therein through the pipes 27, though this operation is not strictly necessary. It is to be understood, of course, that during the filtering operation the filters do not rotate. If the screen 22 becomes clogged by the accumulation of sludge thereon, it can be readily cleaned by cutting off the pressure and simply rotating the filter, so that the sludge will be washed clean; but when it is desired to clean out the filter-bed a special air-cleaning operation is carried on. In the first place the supply of sewage to the pipe 10 is cut off and the filter allowed to stand until it frees itself as much as possible by gravity. An air-pipe is now connected to the pipe 10 or to the interior of the filter within the filter-bed, so that pressure will be imposed on the sludge within the same to express water therefrom. The latter being foul should not be passed to the nitrifying apparatus, but should be returned to the catch-basin. Air is now applied through the pipes 27 within the shell and outside of the filter-bed and in blowing through the interstices between the filtering material effectively cleans the same. By rotating the filter the flights 24 will carry the sludge therein to the front end, which sludge can be removed through the manholes 12 and conveyed to the incinerating apparatus. The liquid effluent from the rotary filters flows down the trough 6 and enters the tunnel of the nitrifying apparatus, in which tunnel the liquid slowly percolates between and around the bed of carbonate of lime or magnesia pebbles or other suitable granular material. Air at the same time is supplied to the nitrifying-sluices through the perforated air-pipes 31, whereby the filtrate is oxidized and purified by the action of zoögloea, as in the common vital process of purification. It will be understood that instead of supplying air to the nitrifying-sluices it can be excluded therefrom, so that the sluices will act as septic tanks, although such a construction is not considered desirable. From the nitrifying-sluices the liquid flows into the trough 7 and by means of the pipes 42 is evenly distributed into one of the two intermediate filters which are used alternately and from which it escapes through the filter-bed thereof into the resting-tanks 4 4. The capacity of these resting-tanks is such as to permit a resting operation to take place, any sediment deposited from the liquid accumulating on the inclined bottoms 44 thereof and being removed from time to time through the pipes 45. The liquid from the resting-tanks slowly escapes therefrom through the porous tiling 48 and filter-bed 47, passing finally through the pipes 51 into the trough 8, by which it is conveyed to the nearest stream or is otherwise used. Preferably the air which is used in aerating the liquid passing through the nitrifying-sluices is heated, since the best results are obtained therefrom. The heating of this air can be effectively done at the cremation-furnace. The air which is drawn off through the pipes 36 from the nitrifying-sluices being charged with noxious gases is also preferably conducted to the cremating apparatus where such gases are dissociated and rendered harmless and inoffensive.

While I prefer to make use of one or more filters for effecting the preliminary removal from the sewage of the solid matters held in suspension therein, it will be understood that other apparatus for effecting this result can be employed. For example, instead of the filters 1 I may make use of settling-tanks into which the sewage is conveyed and wherein the solid matter will be deposited at the bottom. The semiliquid sludge so accumulated can then be pumped directly to the cremation-furnace, being about the same consistency as the wet slurry which occurs in cement-burning. The relatively clear liquid above the layer of sediment can then be pumped, siphoned, or drawn off and directed to the nitrifying-sluices, or the raw sewage may be conveyed to tanks in which the road-detritus is deposited and from which it passes into a suitable septic tank in which the organic solids held in suspension are broken down and liquefied by the action of the anaërobic bacteria therein. From this tank the liquid flows to and through the biological nitrifying-sluices and thence (if the highest rate of purification is desired) through the final filters.

Having now described my invention, what I claim as new, and desire to secure by Letters Patent, is as follows:

1. An apparatus for purifying sewage, comprising in combination a rotatable self-cleaning filter for separating the bulk of the solid matter from the sewage, a nitrifying or asepticizing apparatus for oxidizing the relatively clear effluent, and means for finally subjecting the resulting effluent to a further treatment for the removal of the remaining solid impurities, substantially as and for the purposes set forth.

2. An apparatus for purifying sewage, comprising in combination, a rotatable self-cleaning filter for separating the bulk of the solid matter from the sewage, a closed tunnel-like nitrifying or asepticizing apparatus for oxidizing the relatively clear effluent, and means for finally subjecting the resulting effluent to a further treatment for the removal of the remaining solid impurities, substantially as set forth.

3. An apparatus for purifying sewage, comprising in combination, a rotatable self-cleaning filter for separating the bulk of the solid matter from the sewage, a closed tunnel-like nitrifying or asepticizing apparatus for oxidizing the relatively clear effluent, a resting-tank for receiving the liquid from the latter, and a vertical filter surrounding said resting-tank, substantially as set forth.

4. An improved nitrifying or asepticizing device for purifying and oxidizing liquid effluent, comprising a closed tunnel and means for injecting air therein, substantially as set forth.

5. An improved nitrifying or asepticizing device for purifying and oxidizing liquid effluent, comprising a closed tunnel containing broken rock, and means for injecting air therein, substantially as set forth.

6. An apparatus for purifying sewage, comprising in combination means for separating the solid matter from the sewage, a closed nitrifying or asepticizing tunnel through which the liquid effluent from the separating apparatus flows, and means for injecting air in said tunnel, substantially as set forth.

7. An apparatus for purifying sewage, comprising in combination means for separating the solid matter from the sewage, a closed nitrifying or asepticizing tunnel through which the liquid effluent from the separating apparatus flows, means for injecting air in said tunnel, and a water seal at each end of said tunnel for excluding atmospheric air therefrom, substantially as set forth.

8. An apparatus for purifying sewage, comprising in combination means for separating from the sewage the solid matter held in suspension therein, and a closed nitrifying or asepticizing tunnel to which the liquid effluent from the separating apparatus is supplied, said tunnel being in the form of connected parallel sluices, substantially as set forth.

9. An apparatus for purifying sewage, comprising in combination means for separating from the sewage the solid matter held in suspension therein, a closed nitrifying or asepticizing tunnel to which the liquid effluent from the separating apparatus is supplied, said tunnel being in the form of connected parallel sluices, and air-injection pipes in said sluices for aerating the fluid passing through the same, substantially as set forth.

10. An apparatus for purifying sewage, comprising in combination means for separating from the sewage the solid matter held in suspension therein, a closed nitrifying or asepticizing tunnel to which the liquid effluent from the separating apparatus is supplied, said tunnel in the form of connected parallel sluices, air-injection pipes in said sluices for aerating the fluid passing through the same, and manholes in the top walls of said sluices, substantially as set forth.

11. An apparatus for purifying sewage, comprising in combination means for separating from the sewage the solid matter held in suspension therein, a closed nitrifying or asepticizing apparatus to which the liquid effluent from the separating apparatus is supplied, a trough leading from the latter apparatus, a series of distributing-pipes passing out from said trough, and a filter-bed adjacent to which said distributing-pipes are located, substantially as set forth.

12. An apparatus for purifying sewage, comprising in combination means for separating from the sewage the solid matter held in suspension therein, a closed nitrifying or asepticizing apparatus to which the liquid effluent from the separating apparatus is supplied, a trough leading from the latter apparatus, a series of distributing-pipes passing out from said trough, and a plurality of filter-beds adjacent to which said distributing-pipes are located, substantially as set forth.

13. An apparatus for purifying sewage, comprising in combination means for separating from the sewage the solid matter held in suspension therein, a closed nitrifying or asepticizing apparatus to which the liquid effluent from the separating apparatus is supplied, a trough leading from the latter apparatus, a series of distributing-pipes passing out from said trough, a plurality of filter-beds adjacent to which said distributing-pipes are located, and a gate in said trough between said filter-beds, substantially as set forth.

14. An apparatus for purifying sewage, comprising in combination means for separating from the sewage the solid matter held in suspension therein, a nitrifying or asepticizing apparatus to which the liquid effluent from said separating device is supplied, a resting-tank for receiving the liquid from the latter, and a vertical filter surrounding said resting-tank, substantially as set forth.

15. An apparatus for purifying sewage, comprising in combination means for separating from the sewage the solid matter held in suspension therein, a nitrifying or asepticizing apparatus to which the liquid effluent from said separating device is supplied, a resting-tank for receiving the liquid from the latter, and a vertical filter surrounding said resting-tank and constituting a part of its vertical walls, substantially as set forth.

16. In combination with a sewage-purification apparatus, of a resting-tank combined with a vertical filter, the latter forming part of the walls of the resting-tank, and an air-pipe embedded within the filter for injecting air therein.

17. In combination with a sewage-purification apparatus, of a resting-tank combined with a vertical filter, the latter forming part of the walls of the resting-tank, and a sluice or drain connected with said filter and passing through the walls of the tank for receiving the filtrate therefrom.

18. In a sewage-purification apparatus, a rotary filter comprising a closed shell, a filter-bed in said shell, means for admitting the sewage on one side of said filter-bed, and means for admitting air on the other side of said filter-bed, substantially as set forth.

19. In a sewage-purification apparatus, a rotary filter comprising a closed shell, a filter-bed in said shell, means for admitting the sewage on one side of said filter-bed, means for admitting air on the other side of said filter-bed, and a series of flights or conveyers coöperating with said filter-bed, substantially as set forth.

20. In a sewage-purification apparatus, a rotary filter comprising a cylindrical shell, a rectangular filter-bed mounted in said shell, means for supplying the sewage to the inside of said filter-bed, means for withdrawing the liquid effluent from the outside of said filter-bed, and air-pipes within the shell outside of the filter-bed for cleaning the latter when desired, substantially as set forth.

21. In a sewage-purification apparatus, a rotary filter comprising a cylindrical shell, a rectangular filter-bed mounted in said shell, means for supplying the sewage to the inside of said filter-bed, means for withdrawing the liquid effluent from the outside of said filter-bed, air-pipes within the shell outside of the filter-bed for cleaning the latter when desired, and a plurality of flights or conveyers on the inside of the filter-bed, substantially as set forth.

This specification signed and witnessed this 7th day of December, 1901.

FRANK MARTIN.

Witnesses:
GEORGE E. ROLLINS,
ALEXANDER C. DUNBAR.